(12) United States Patent
Yeh et al.

(10) Patent No.: US 8,070,477 B2
(45) Date of Patent: Dec. 6, 2011

(54) MOLD ASSEMBLY HAVING HEAT PIPES PASSING THROUGH PARALLEL FINS

(75) Inventors: Chin-Wen Yeh, Taipei Hsien (TW); Zhi-Jian Peng, Shenzhen (CN); Hai-Shan Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/730,361

(22) Filed: Mar. 24, 2010

(65) Prior Publication Data

US 2011/0135780 A1    Jun. 9, 2011

(30) Foreign Application Priority Data

Dec. 7, 2009 (CN) .......................... 2009 2 20316693

(51) Int. Cl.
*B29C 45/73* (2006.01)
(52) U.S. Cl. ....................................... 425/547; 425/552
(58) Field of Classification Search .................. 425/546, 425/547, 552
See application file for complete search history.

(56) References Cited

U.S. PATENT DOCUMENTS 5,423,670 A * 6/1995 Hamel .......................... 425/144
6,554,606 B1 * 4/2003 Koide et al. ................... 425/590

* cited by examiner

*Primary Examiner* — Timothy Heitbrink
(74) *Attorney, Agent, or Firm* — Altis Law Group, Inc.

(57) ABSTRACT

A mold assembly includes a mold moving half, at least one heat sink positioned on the mold moving half, and a plurality of heat pipes positioned on the mold fixed half and on the at least one heat sink. The at least one heat sink includes a plurality of parallel fins. The plurality of parallel fins is secured to the heat pipes with the heat pipes passing therethrough. The heat pipes are capable of moving together with the mold moving half.

13 Claims, 5 Drawing Sheets

MOLD ASSEMBLY HAVING HEAT PIPES PASSING THROUGH PARALLEL FINS

BACKGROUND

1. Technical Field

The present disclosure relates to mold assemblies, and particularly to mold assemblies with heat sinks.

2. Description of Related Art

A typical injection mold usually includes a fixed mold half and a movable mold half. During the injection process, the movable mold half moves relative to the fixed mold half for shaping the work piece. The movable mold half includes a plurality of cooling pipes passing therethrough. One terminal of each of the cooling pipes is fixed on an injection machine. The cooling pipes are dissipating heat for the movable mold half by flowing water therethrough. However, the pluralities of cooling pipes tend to bend when the movable mold half moves toward the fixed mold half during the injection process, which will have further influence on the heat dissipation efficiency when the cooling pipes are damaged.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
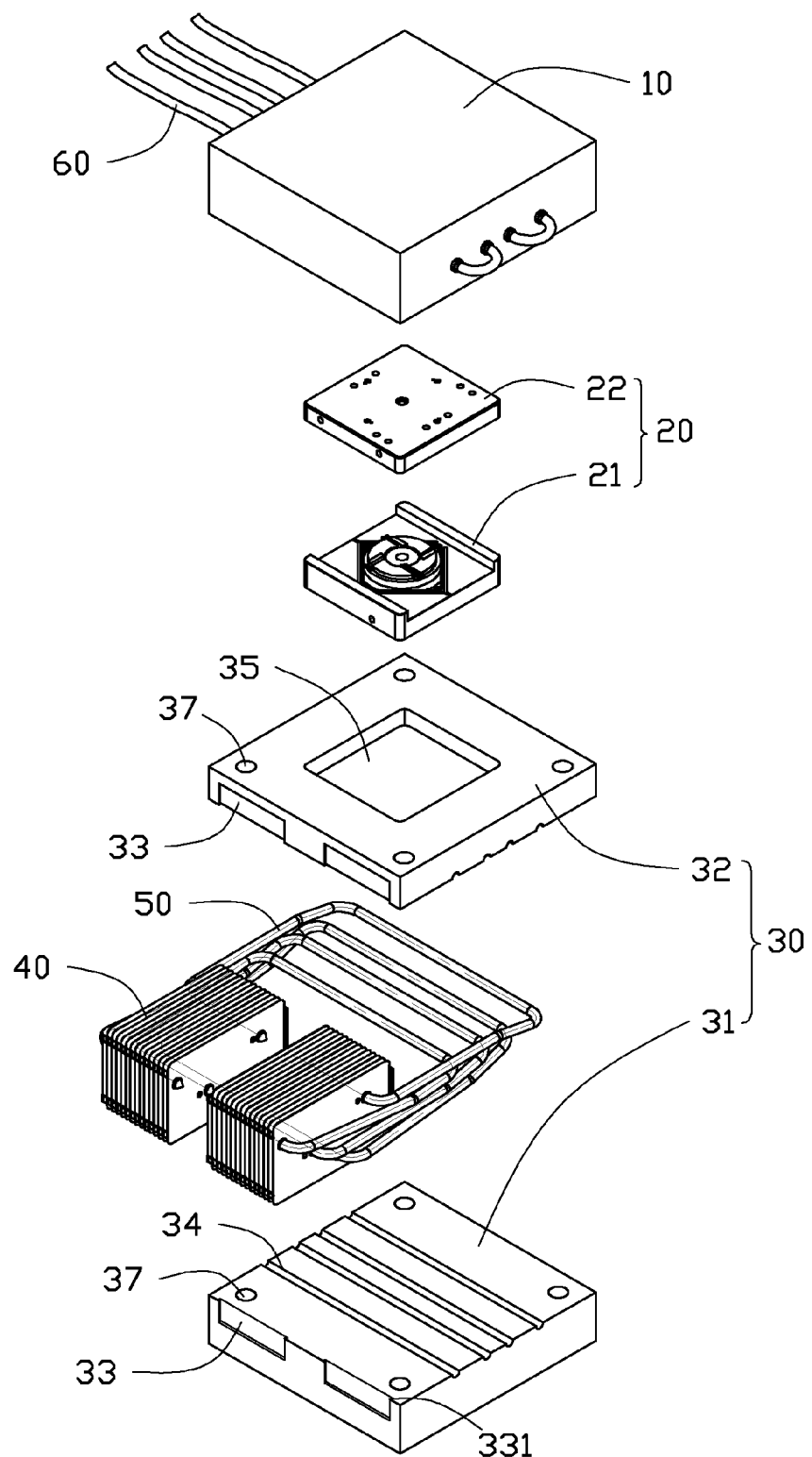
FIG. 1 is an exploded view of a mold assembly, in accordance with an embodiment.
Figure 2:
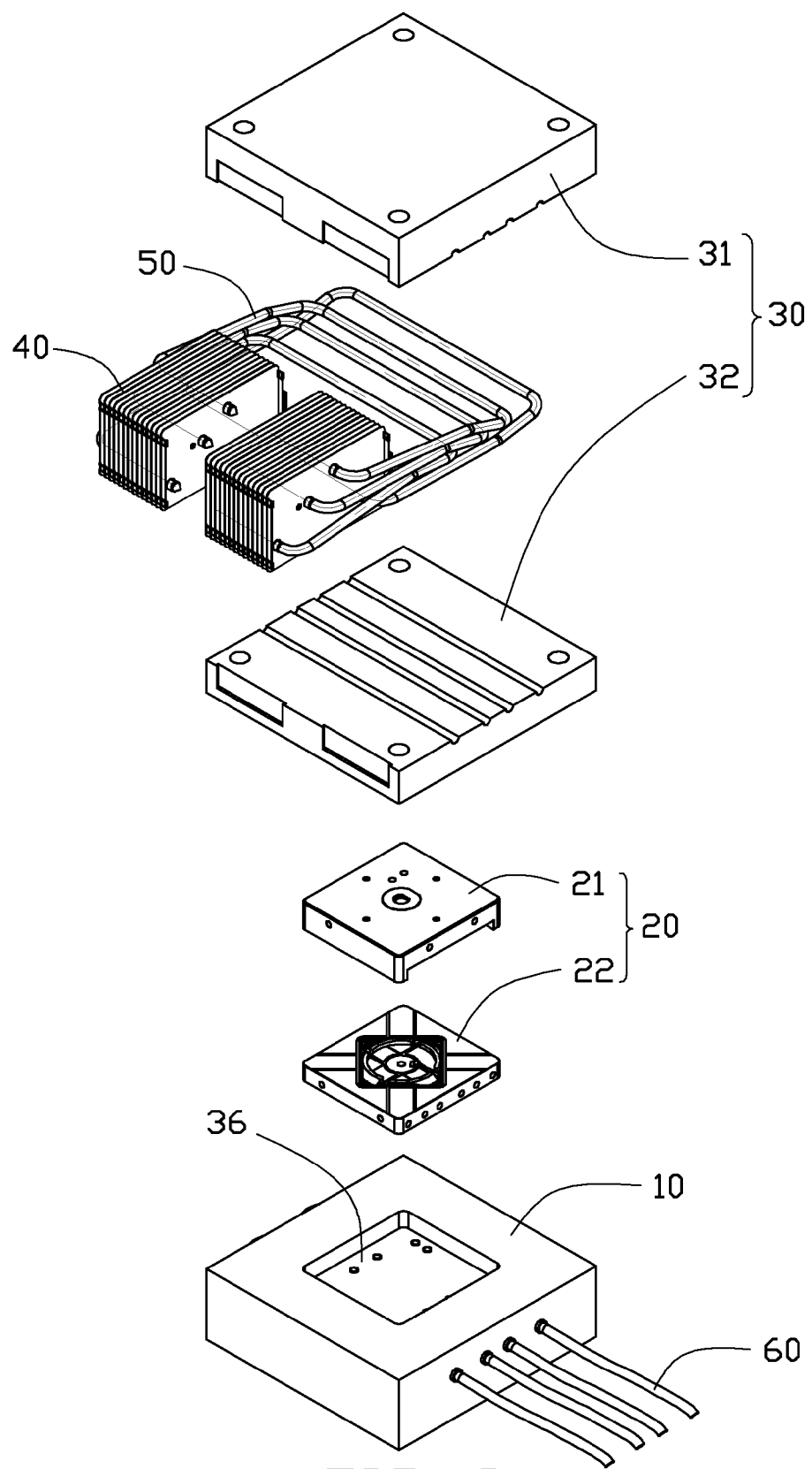
FIG. 2 is similar to FIG. 1, viewed from another aspect of the mold assembly.
Figure 3:
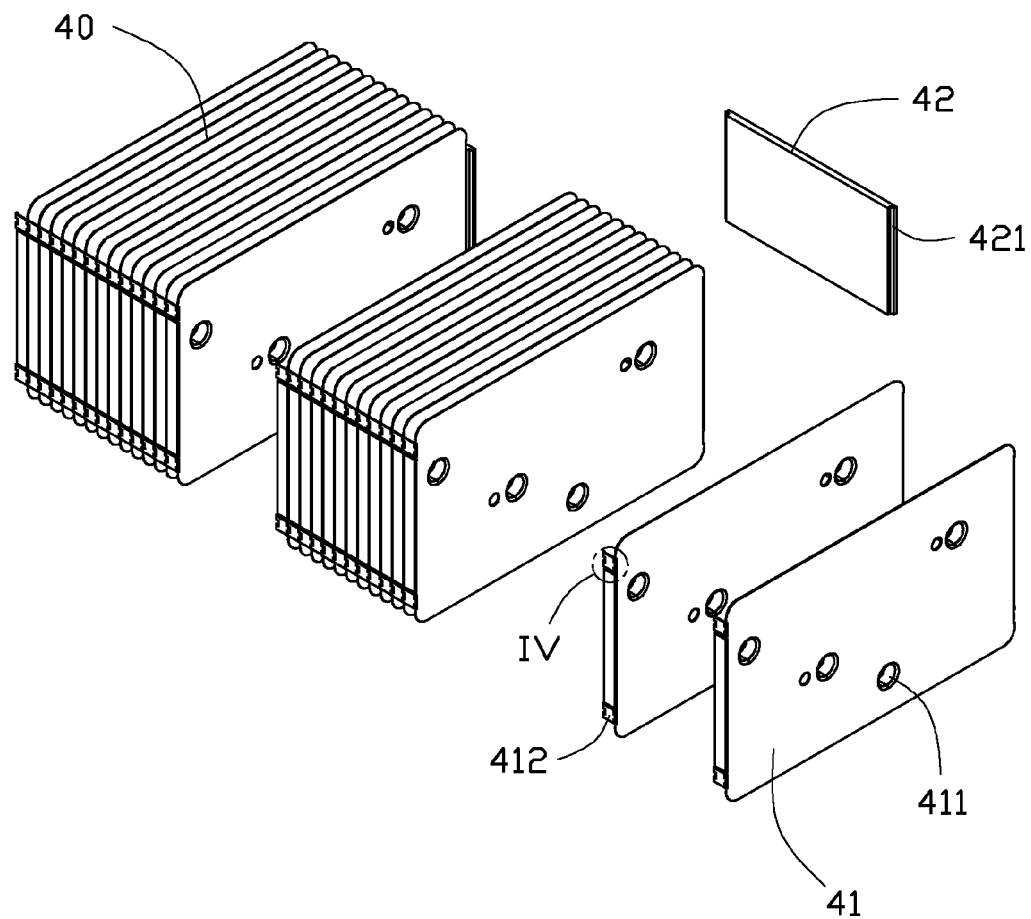
FIG. 3 is an exploded view of the heat sink of FIG. 1.

Referring to FIGS. 1 to 3, a mold assembly includes a fixed mold half 10, a cavity 20, and a movable mold half 30. A plurality of heat sinks 40 are positioned on the movable mold half 30, and a plurality of heat pipes 50 positioned on the plurality of heat sinks 40. Each of the plurality of heat sinks 40 includes a plurality of parallel fins 41, and a fixing base 42 positioned on one side of the plurality of parallel fins 41. Each of the parallel fins 41 includes a plurality of circular holes 411 therein. Two terminals of each of the heat pipes 50 pass through the circular holes 411 of the corresponding parallel fins 41. A middle portion of each of the heat pipes 50 is positioned on the movable mold half 30. A plurality of fans (not shown) is positioned on one side of the plurality of heat sinks 40 for heat dissipation.

Figure 4:
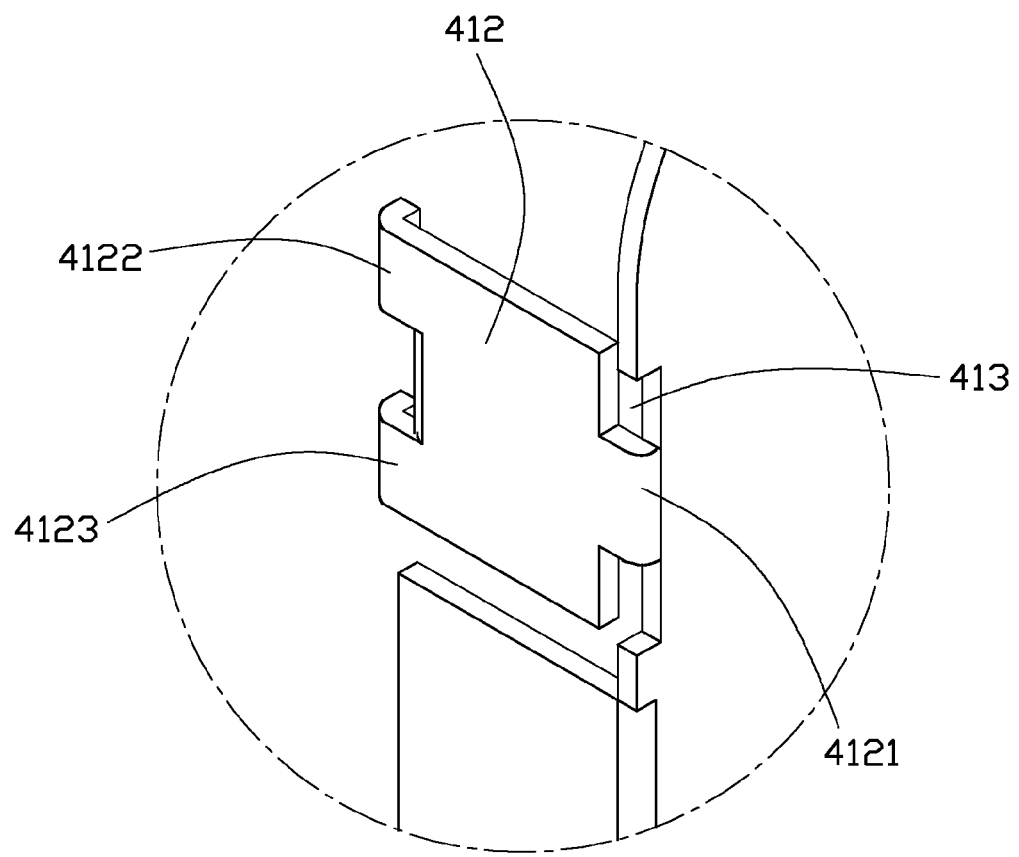
FIG. 4 is a partial enlarged view of circled portion IV of FIG. 3.
Figure 5:
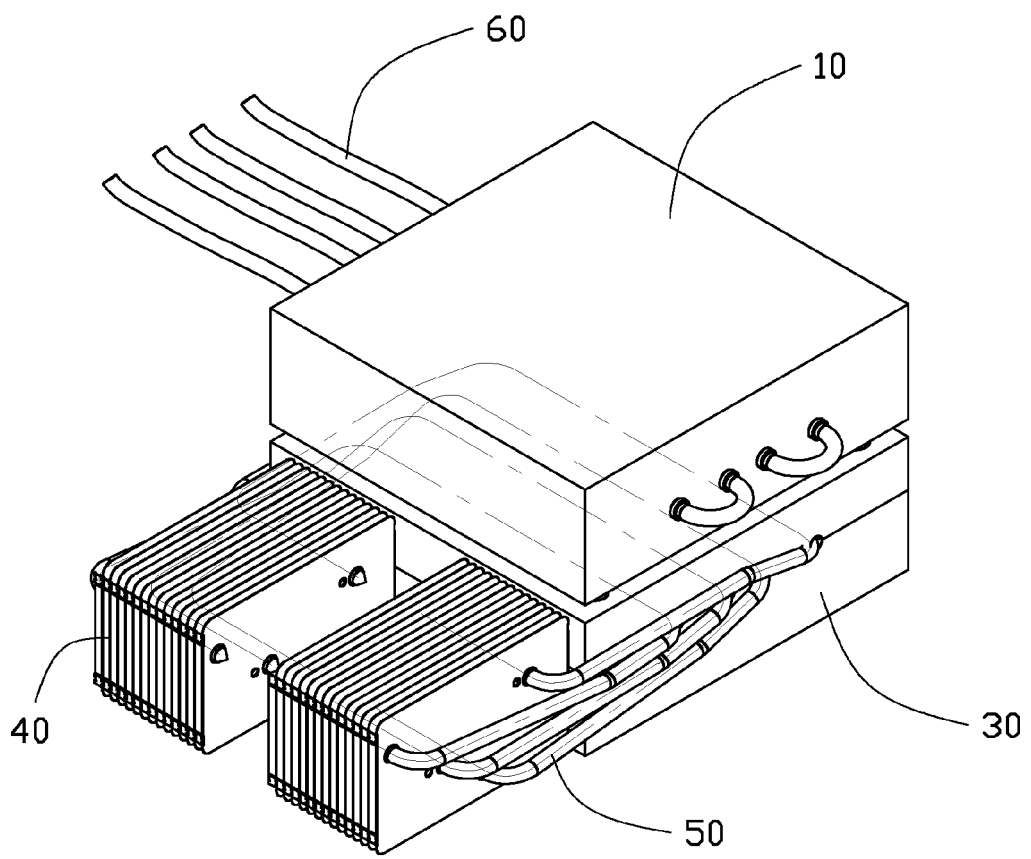
FIG. 5 is an assembled view of the mold assembly of FIG. 1.

Referring to FIGS. 4 and 5, each of the parallel fins 41 further includes a locking member 412 at one edge of each of the parallel fins 41. Each of the locking members 412 includes a connection portion 4121 extending from a side edge of the locking member 412, and first and second fixing legs 4122, 4123, bending from opposite side edge of the locking member 412. Each of the connection portions 4121 connects to the edge of the corresponding fin 41, and is capable of elastically bending relative to the edge of the corresponding fin 41. A pair of gaps 413 is located on two sides of each connection portion 4121 respectively. The first and second fixing legs 4122, 4123 of one fin 41 are capable of engaging with the pair of gaps 413 of an adjacent fin 41 to secure the adjacent parallel fins 41 together. The locking members 412 are capable of fixing two adjacent fins 41 together to prevent the fins 41 from moving.

The movable mold half 30 includes a first mold base 31, and a second mold base 32. The cavity 20 includes a movable cavity half 21, capable of being positioned in the movable mold half 30, and a fixed cavity half 22, capable of being positioned in the fixed mold half 10. The second mold base 32 includes an accommodating recess 35 for receiving the movable cavity half 21. The fixed mold half 10 includes an accommodating recess 36 for receiving the fixed cavity half 22. The fixed mold half 10 and the fixed cavity half 22 are capable of fixing a plurality of cooling pipes 60 thereon. The plurality of cooling pipes 60 are capable of dissipating heat for the fixed cavity half 22 by flowing water therethrough, when the fixed cavity half 22 is mounted in the fixed mold half 10.

The first and second mold bases 31 and 32 includes a plurality of fixing slots 33 on one side, for receiving the plurality of heat sinks 40. The fixing base 42 includes a pair of step-shaped portions 421 on two sides respectively. The fixing slots 33 include a pair of accommodating grooves 331 on two sides, for receiving the pair of step-shaped portions 421 respectively. The first and second mold bases 31 and 32 further includes a plurality of parallel fixing grooves 34 in the middle for accepting the plurality of heat pipes 50. A middle portion of each of the heat pipes 50 is located in the corresponding fixing groove 34.

Referring to FIG. 5, in assembly, the movable cavity half 21 is received in the accommodating recess 35, and the fixed cavity half 22 is received in the accommodating recess 36. The heat sinks 40 and the fixing bases 42 are secured in the first and second mold bases 31 and 32 via the corresponding fixing slots 33. The middle portions of the plurality of heat pipes 50 are received in the first and second mold bases 31 and 32 corresponding fixing grooves 34. Each of the first and second mold bases 31 and 32 further include four screw holes 37 on the corners. The four screws pass through the corresponding screw holes 37 to fix the first and second mold bases 31 and 32 together. During the injection process, a thermostat is capable of controlling the plurality of fans rotating to dissipate heat for the plurality of heat sinks 40. When the temperature on the movable cavity half 21 is too high, the thermostat outputs a control signal to start the plurality of fans. When the temperature on the movable cavity half 21 is decreased to a predetermined value, the thermostat outputs a control signal to stop the plurality of fans. The mold assembly, dissipates heat for the movable mold half 30 by the plurality of heat sinks 40 and heat pipes 50 positioned thereon. The typical cooling pipes of the movable mold half 30 is replaced by the heat sinks 40 and heat pipes 50. The heat sinks 40 and heat pipes 50 are no longer fixed on an injection machine. Therefore, the unwanted bending of the heat pipes 50 is avoided, and heat dissipation efficiency is improved.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mold assembly, comprising:
   a mold moving half;
   at least one heat sink positioned on the mold moving half, and the at least one heat sink comprises a plurality of parallel fins; and
   a plurality of heat pipes positioned on the mold fixed half and on the at least one heat sink;
   wherein the plurality of parallel fins are secured to the plurality of heat pipes with the plurality of heat pipes passing therethrough; and the plurality of heat pipes being capable of moving together with the mold moving half; wherein the mold moving half comprises a first mold base and a second mold base positioned on the first mold base; each of the first and second mold bases comprises at least one fixing slot on one side for receiving the at least one heat sink.

2. The mold assembly of claim 1, wherein the at least one heat sink further comprises a fixing base at the bottom for securing the plurality of parallel fins; the fixing base comprises a pair of step-shaped portions on two sides respectively; each fixing slot comprises a pair of accommodating grooves on two sides for receiving the pair of step-shaped portions.

3. The mold assembly of claim 2, wherein each of the first and second mold bases comprises a plurality of parallel fixing grooves in the middle for securing the plurality of heat pipes; and a middle portion of each of the plurality of heat pipes is fixed in the corresponding fixing groove.

4. The mold assembly of claim 3, wherein each of the plurality of parallel fins defines a plurality of circular holes; two terminals of each of the plurality of heat pipes pass through the circular holes of the corresponding fins; and the fixing base is received in fixing slots for securing the plurality of heat pipes and heat sink on the mold moving half.

5. The mold assembly of claim 4, wherein each fin further comprises a locking member at the top edge; each locking member comprises a connection portion, extending from a side edge of the locking member, and a first and a second fixing leg bending from an opposite side edge of the locking member; each of the connection portion is connected to the edge of the corresponding fin, and is capable of being elastically bent relative to the edge of the corresponding fin; the first and second fixing legs of one fin are capable of engaging two sides of the connection portion of an adjacent fin to secure adjacent fins together.

6. A mold assembly, comprising:
   a mold fixed half;
   a mold moving half;
   at least one heat sink positioned on the mold moving half, and the at least one heat sink comprises a plurality of parallel fins; and
   a plurality of heat pipes positioned on the mold fixed half and on the at least one heat sink;
   wherein the plurality of parallel fins are secured to the plurality of heat pipes with the plurality of heat pipes passing therethrough; two terminals of each of the plurality of heat pipes are positioned on the plurality of parallel fins; and a middle of each of the plurality of heat pipes is positioned on the mold moving half.

7. The mold assembly of claim 6, further comprising a moving half cavity capable of positioned in the mold moving half, and a fixed half cavity capable of positioned in the mold fixed half; each of the mold moving half and the mold fixed half comprises an accommodating recess for receiving the moving half cavity and the fixed half cavity respectively.

8. The mold assembly of claim 7, wherein the mold fixed half is capable of fixing a plurality of cooling pipes thereon; the plurality of cooling pipes are capable of dissipating heat for the fixed half cavity by which water flows therein when the fixed half cavity is mounted in the mold fixed half.

9. The mold assembly of claim 6, wherein the mold moving half comprises a first mold base and a second mold base positioned on the first mold base; each of the first and second mold bases comprises at least one fixing slot on one side for receiving the at least one heat sink.

10. The mold assembly of claim 9, wherein the at least one heat sink further comprises a fixing base at the bottom for securing the plurality of parallel fins; the fixing base comprises a pair of step-shaped portions on two sides respectively; each fixing slot comprises a pair of accommodating grooves on two sides for receiving the pair of step-shaped portions.

11. The mold assembly of claim 10, wherein each of the first and second mold bases comprises a plurality of parallel fixing grooves in the middle for securing the plurality of heat pipes; and a middle portion of each of the plurality of heat pipes is fixed in the corresponding fixing groove.

12. The mold assembly of claim 11, wherein each of the plurality of parallel fins defines a plurality of circular holes; two terminals of each of the plurality of heat pipes pass through the circular holes of the corresponding fins; and the fixing base is received in fixing slots for securing the plurality of heat pipes and heat sink on the mold moving half.

13. The mold assembly of claim 12, wherein each fin further comprises a locking member at the top edge; each locking member comprises a connection portion, extending from a side edge of the locking member, and a first and a second fixing leg bending from an opposite side edge of the locking member; each of the connection portion is connected to the edge of the corresponding fin, and is capable of being elastically bent relative to the edge of the corresponding fin; the first and second fixing legs of one fin are capable of engaging two sides of the connection portion of an adjacent fin to secure adjacent fins together.

* * * * *